United States Patent
Takahashi et al.

(10) Patent No.: US 7,513,429 B2
(45) Date of Patent: Apr. 7, 2009

(54) SYMBOL ILLUMINATION APPARATUS AND VIDEO DISPLAY APPARATUS

(75) Inventors: Hitoshi Takahashi, Kanagawa (JP);
Hiroyoshi Maeda, Saitama (JP);
Hideaki Yokka, Toyama (JP); Eiji Amaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 608 days.

(21) Appl. No.: 11/177,357

(22) Filed: Jul. 11, 2005

(65) Prior Publication Data

US 2006/0101684 A1      May 18, 2006

(30) Foreign Application Priority Data

Jul. 12, 2004   (JP)   ............. P2004-205208

(51) Int. Cl.
*G06K 7/10* (2006.01)
(52) U.S. Cl. ............. 235/462.42; 235/462.05
(58) Field of Classification Search ............. 235/462.42, 235/462.01, 462.05
See application file for complete search history.

(56) References Cited

U.S. PATENT DOCUMENTS

| | | | |
|---|---|---|---|
| 5,944,405 A | 8/1999 | Takeuchi et al. | |
| 5,969,343 A | 10/1999 | Nakamura et al. | |
| 6,992,718 B1* | 1/2006 | Takahara | 348/333.09 |
| 7,294,478 B1* | 11/2007 | Hinchcliffe | 435/7.9 |
| 2005/0180687 A1 | 8/2005 | Amitai | |

FOREIGN PATENT DOCUMENTS

| | | |
|---|---|---|
| DE | 199 61 390 | 6/2001 |
| EP | 0 760 577 | 3/1997 |
| GB | 2 386 460 | 9/2003 |
| JP | 52-106086 | 8/1977 |
| JP | 4-206104 | 7/1992 |
| JP | 6-235916 | 8/1994 |
| JP | 10-62780 | 3/1998 |
| JP | 10-133607 | 5/1998 |
| JP | 2001-100680 | 4/2001 |
| JP | 2002-126108 | 5/2002 |
| JP | 2003-254790 | 9/2003 |
| JP | 2004-93235 | 3/2004 |
| WO | WO 03/081320 | 10/2003 |

OTHER PUBLICATIONS

"Notification of Reasons for Refusal" from the Japanese Patent Office in corresponding Japanese Patent Application No. 2004-205208 issued Nov. 11, 2008.

* cited by examiner

*Primary Examiner*—Daniel St.Cyr
(74) *Attorney, Agent, or Firm*—Finnegan, Henderson, Farabow, Garrett & Dunner, L.L.P.

(57) ABSTRACT

The present invention provides a symbol illumination apparatus configured to have a symbol such as characters printed on a front surface of a transparent member, and to allow light from a plurality of light sources to pass through an interior of the transparent member from one side of the transparent member, to illuminate the symbol. A lens sheet and a diffused sheet are inserted between the transparent member and the plurality of light sources in the symbol illumination apparatus. This configuration prevents a plurality of light rays from being seen on the bottom of the transparent member.

10 Claims, 8 Drawing Sheets

SYMBOL ILLUMINATION APPARATUS AND VIDEO DISPLAY APPARATUS

BACKGROUND OF THE INVENTION

1. Field of the Invention

The present invention relates to a symbol illumination apparatus that is arranged to illuminate a symbol such as characters representing a company's name or the like, and to a video display apparatus, such as a flat panel display, a flat panel color television or the like, using a Plasma Display Panel (PDP), a liquid-crystal panel or the like, to which this symbol illumination apparatus is applied.

2. Description of Related Art

In the past, in a video display apparatus such as a flat panel display, a flat panel color television or the like, using a PDP, a liquid-crystal panel or the like, a symbol illumination apparatus has been proposed in which a front assembly having a transparent member is provided on the front, and a symbol such as a company logo or the like is printed on the front of this transparent member, and light from a plurality of light sources is arranged to pass through the interior of this transparent member from one side of this transparent member, whereby to illuminate the symbol such as characters to have the symbol seen as if it were shining while floating in the air.

SUMMARY OF THE INVENTION

However, when, e.g., a plurality of light-emitting diodes are used as the plurality of light sources, a plurality of light rays from these plurality of light-emitting diodes are reflected at the bottom of this transparent member, thus imposing an inconvenience that the quality is impaired.

Further, redundant light from the light-emitting diodes as the light sources leaks to another side, e.g., the lower side of this transparent member, for reflection on a stand section of the video display apparatus or a table, thus imposing another inconvenience that leakage of light is noticeable in a dark room or the like.

In view of the above points, the present invention is provided to prevent the plurality of light rays from being reflected at the bottom of the transparent member and also to prevent leakage of light.

A symbol illumination apparatus of the present invention is configured to have a symbol such as characters printed on a front surface of a transparent member, and to allow light from a plurality of light sources to pass through an interior of the transparent member from one side of this transparent member, to illuminate the symbol. In the symbol illumination apparatus, a lens sheet and a diffusion sheet are inserted between this transparent member and the plurality of light sources.

Further, the symbol illumination apparatus of the present invention may have a print with a gradational design provided on an end on another side of this transparent member in the above-recited symbol illumination apparatus.

A video display apparatus of the present invention is provided with a front assembly having a transparent member on a front surface thereof. In the video display apparatus, it is configured to have a symbol such as characters printed on a front surface of the transparent member, and to allow light from a plurality of light sources to pass through an interior of the transparent member from one side of this transparent member, to illuminate the symbol. In the video display apparatus, a lens sheet and a diffusion sheet are inserted between the transparent member and the plurality of light sources.

The video display apparatus of the present invention may have a print with a gradational design provided on an end on another side of this transparent member in the above-recited video display apparatus.

According to the present invention, because of the arrangement that the lens sheet and the diffusion sheet are inserted between the transparent member and the plurality of light sources, a plurality of light rays can no longer be seen, but become even and smooth light to improve the quality.

Further, in the case where the print with a gradational design is provided on the end on another side of the transparent member, light no longer leaks to the outside.

DESCRIPTION OF PREFERRED EMBODIMENTS

Examples of the best mode for carrying out a symbol illumination apparatus and a video display apparatus of the present invention will be described below with reference to the drawings.

Figure 3:
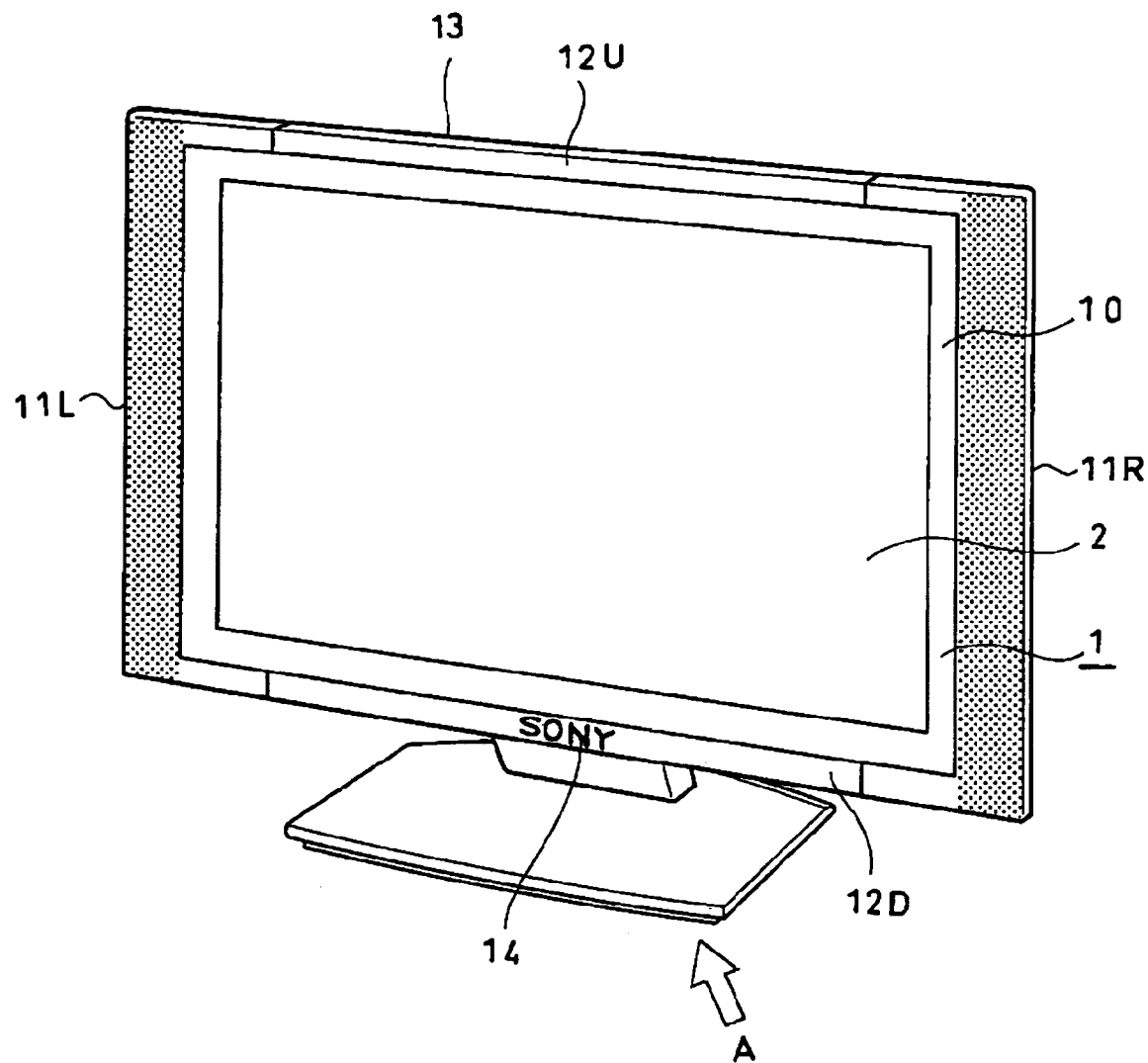
FIG. 3 is a front perspective view showing an example of the best mode for carrying out a video display apparatus of the present invention.
Figure 4:
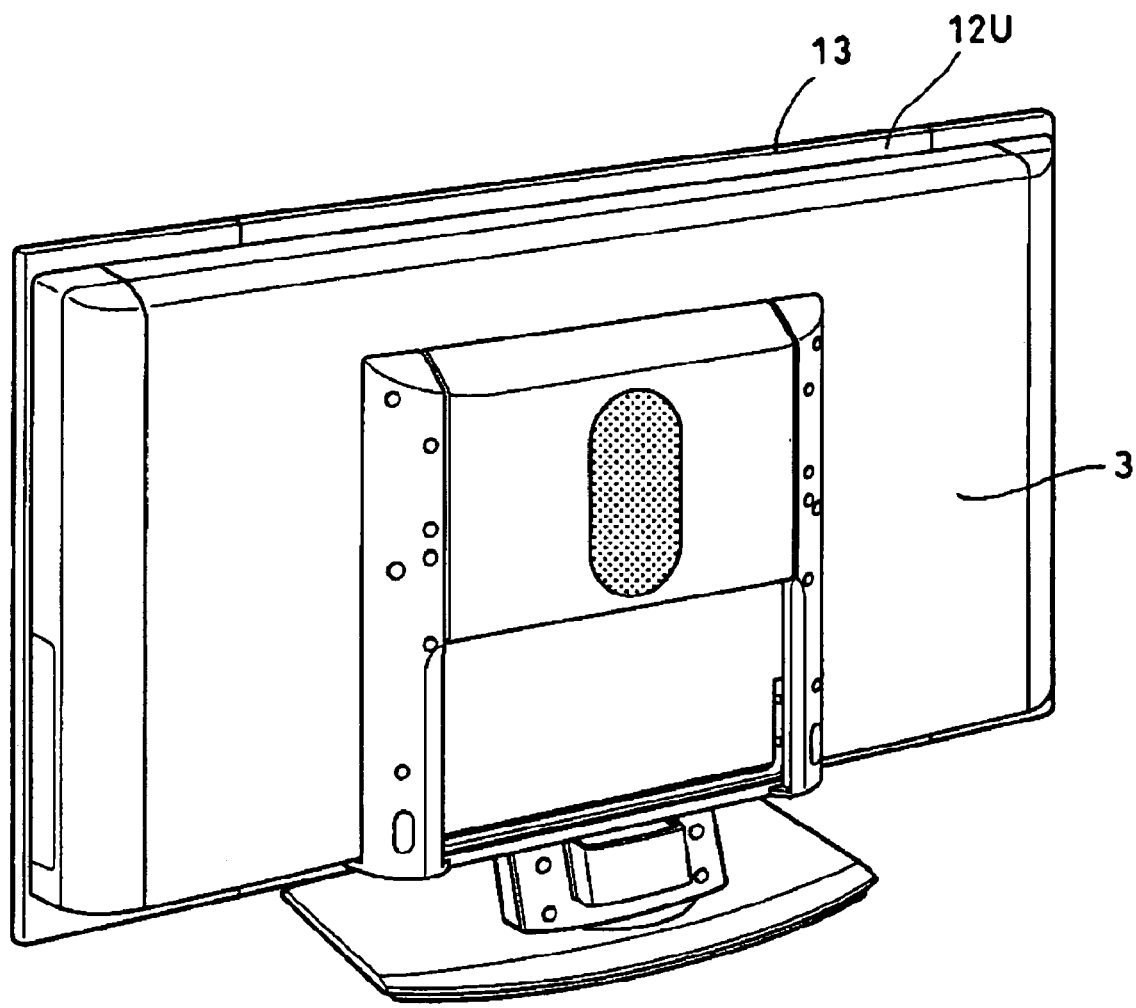
FIG. 4 is a rear perspective view of FIG. 3.

FIG. 3 shows a front perspective view of a video display apparatus according to the present example, and FIG. 4 shows a rear perspective view of this video display apparatus. The present example is one in which the present invention is applied to a PDP flat panel display.

In FIG. 3, a reference symbol 1 denotes a front assembly provided on the front, and a reference symbol 2 denotes a filter glass provided on the front of a video display screen of a plasma display panel and incorporated into this front assembly. In FIG. 4, a reference symbol 3 denotes a rear cover. It is arranged such that a plasma display panel 4, and a display drive circuit, a tuner section, speakers 5 and the like thereof are incorporated between the front assembly 1 and the rear cover 3, as shown in FIGS. 5, 6.

In the present example, it is arranged such that the video display screen of the video display apparatus is, e.g., 42 inches wide, and a depth thereof is set to, e.g., 9.8 cm, which is an extremely thin value.

Figure 1:
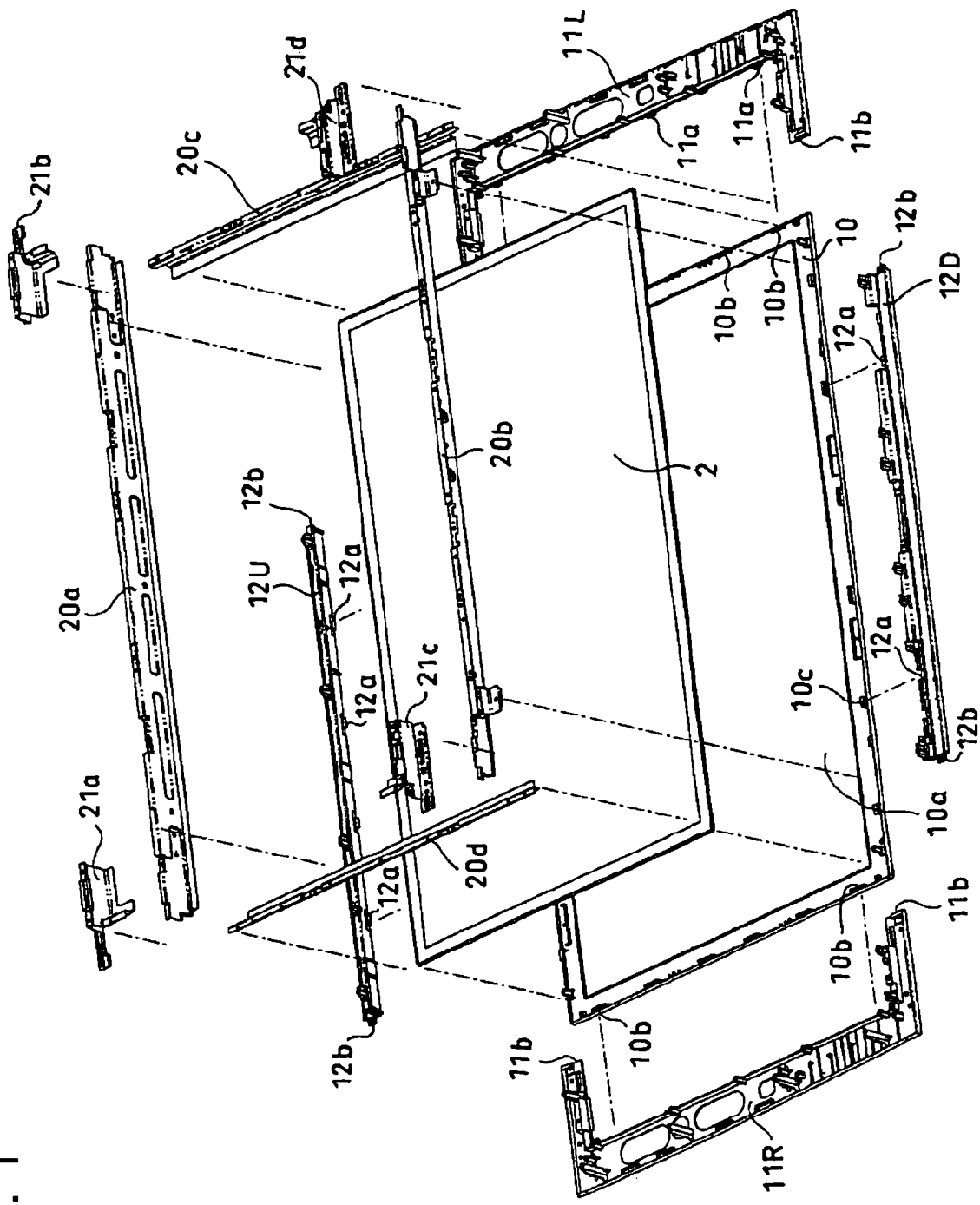
FIG. 1 is an exploded perspective view showing an example of a front assembly as viewed from a rear surface thereof.
Figure 2:
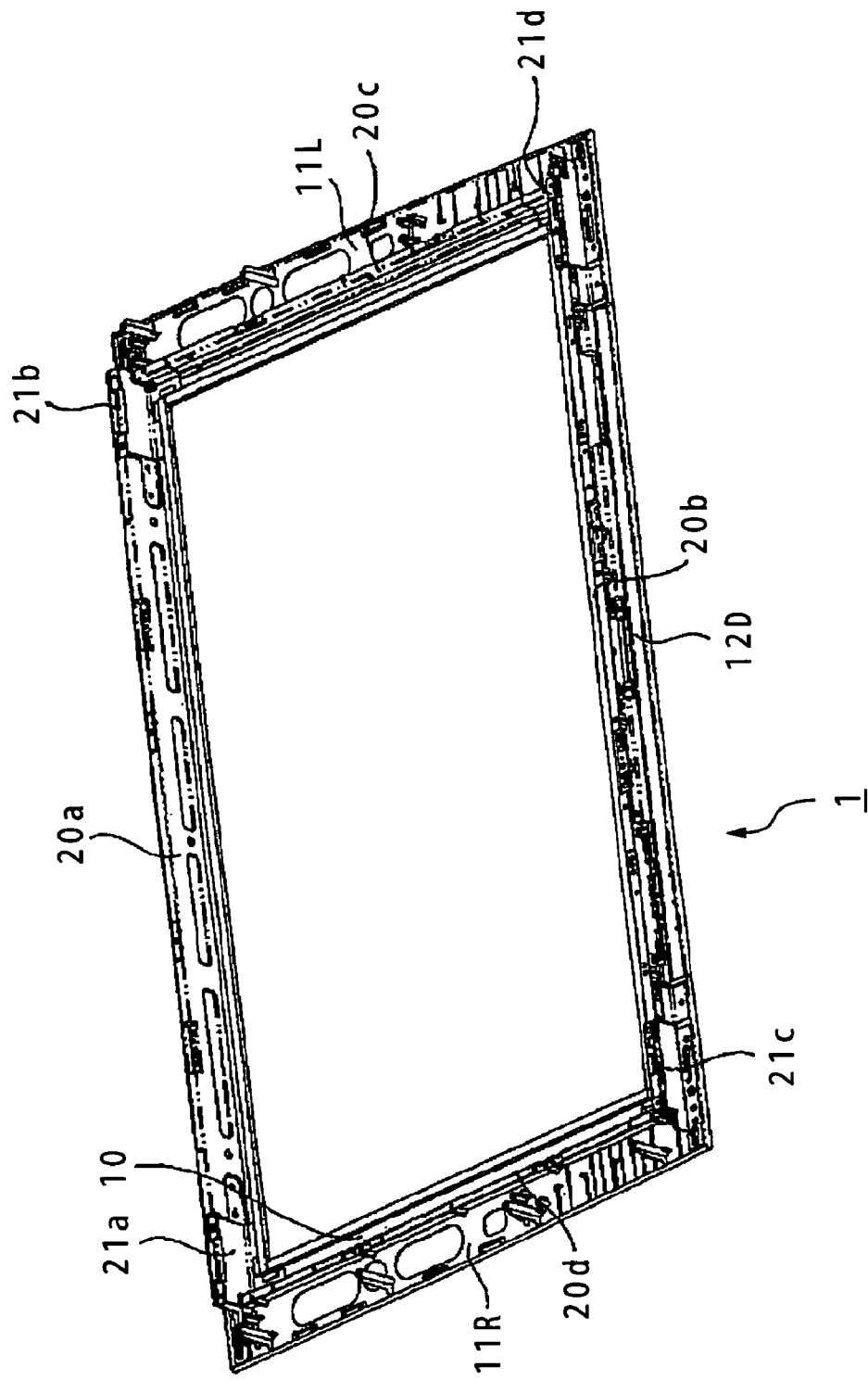
FIG. 2 is a perspective view showing an example of the front assembly as viewed from the rear surface.

This front assembly 1 is configured such as shown in examples of FIGS. 1 and 2. FIG. 1 is an exploded perspective view of the front assembly 1 as viewed from a rear surface thereof, and FIG. 2 is a perspective view of the front assembly 1 as viewed from the rear surface.

Figure 5:
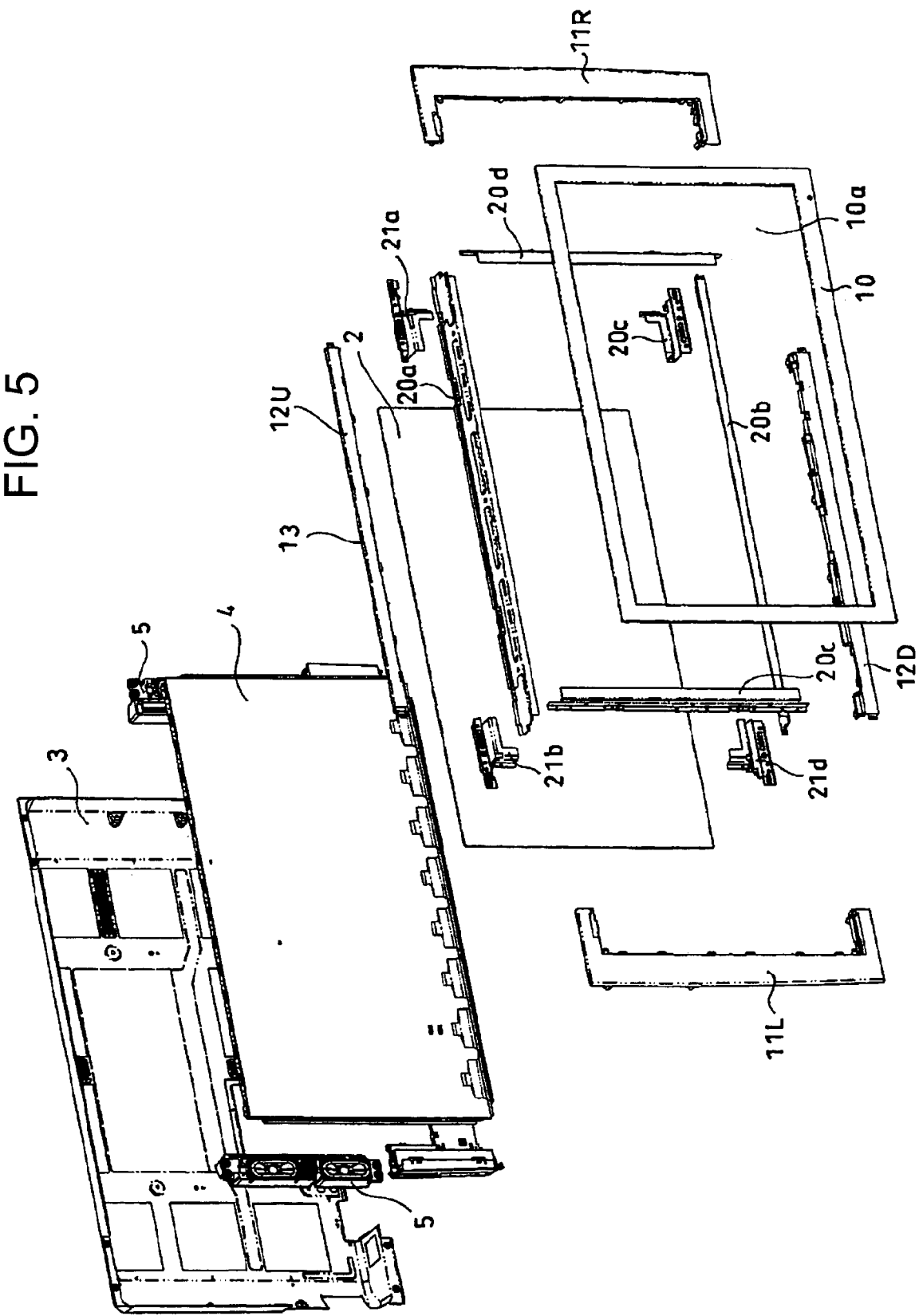
FIG. 5 is an exploded perspective view as viewed from the front of FIG. 3.
Figure 6:
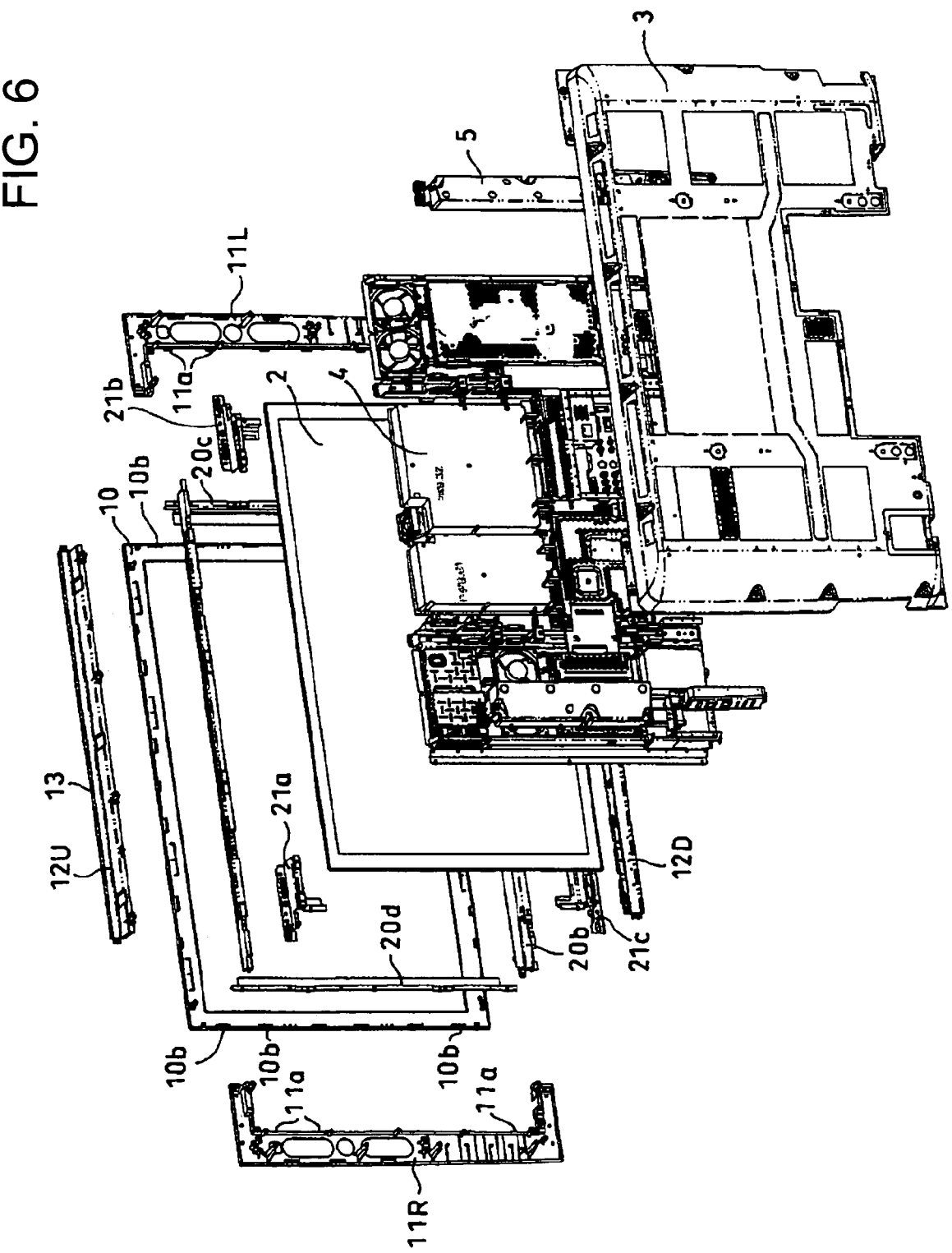
FIG. 6 is an exploded perspective view as viewed from the rear of FIG. 3.

In FIGS. 1, 5, 6, a reference symbol 10 denotes a plate-shaped, rectangular frame having an opening 10a that is almost as large as the video display screen. It is arranged such that this frame 10 is formed by injection molding using, e.g., an ABS resin, and is thereafter subjected to gloss coating, for example.

Further, in FIGS. 1, 5, 6, reference symbols 11L and 11R denote a left speaker mounting plate and a right speaker mounting plate, respectively. These left and right speaker mounting plates 11L and 11R are symmetrical, substantially C-shaped, plate-like members, formed by injection molding using a resin. It is configured to mount the speakers 5 onto these left and right speaker mounting plates 11L and 11R, respectively.

It is arranged such that these left and right speaker mounting plates 11L and 11R are slidably engaged with the left side and right side of the frame 10, respectively. In the present example, a predetermined number of engageable holes 10b are provided in left-side and right-side ends of the frame 10, respectively, by integral molding, and also engageable projections 11a are provided by integral molding on respective inner ends of the left and right speaker mounting plates 11L and 11R in a manner corresponding to the engageable holes 10b of this frame 10, respectively, whereby it is arranged such that the engageable projections 11a on the respective inner ends of the left and right speaker mounting plates 11L and 11R slidably engage with the engageable holes 10b in the left-side and right-side ends of this frame 10.

In FIGS. 1, 5, 6, reference symbols 12U and 12D denote upper and lower transparent members, respectively. These upper and lower transparent members 12U and 12D each have a predetermined width, and a length measured substantially along the upper side and the lower side of the video display screen, and made by injection molding using a transparent acrylic resin material.

It is arranged such that these upper and lower transparent members 12U and 12D are slidably engageable with the upper side and the lower side of the frame 10, respectively. In the present example, a predetermined number of engageable holes 10c are provided in upper-side and lower-side ends of the frame 10 by integral molding, respectively, and also engageable projections 12a are provided on ends of the upper and lower transparent members 12U and 12D which are opposed to the frame 10, by integral molding in a manner corresponding to the engageable holes 10c of this frame 10, whereby it is arranged such that the engageable projections 12a on the opposed ends of the upper and lower transparent members 12U and 12D engage with the engageable holes 10c in the upper-side and lower-side ends of this frame 10.

Figure 7:
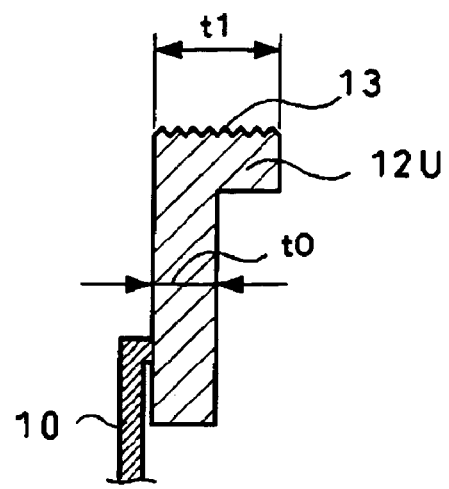
FIG. 7 is a sectional view showing an example of a main portion.

In the present example, an upper side of this upper transparent member 12U is formed to be inverted L-shaped in cross section such as shown in FIG. 7 to have a smooth surface on a front side of this upper transparent member 12U, and also a knurling-like line embossing 13 is provided on the upper surface of this inverted L-shaped member.

As the knurling-like line embossing 13, respective ridges are arranged at an angle of inclination of, e.g., 7 degrees, and at a pitch of 0.5 mm. In this case, a thickness t0 that can satisfactorily form the upper transparent member 12U formed by injection molding is typically in the order of 4 mm. Although the thickness of 4 mm is rather poor in terms of design, when a width t1 of the upper surface of this inverted L-shaped member is set to, e.g., 9 mm, an effect is given that the upper transparent member 12U is apparently seen as thick as 9 mm even if the thickness t0 of this upper transparent member 12U is 4 mm.

Further, when the upper side of this upper transparent member 12U is made to be inverted L-shaped, the member 12U becomes strong and stable also in terms of rigidity.

Figure 8:
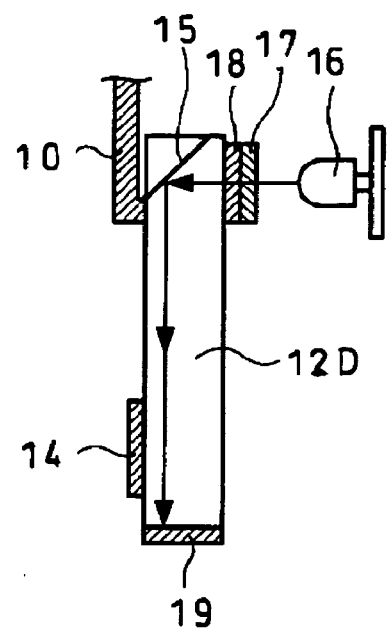
FIG. 8 is a configurational diagram showing an example of a main portion of the present invention.

Furthermore, in the present symbol illumination apparatus, a symbol 14 such as characters representing, e.g., a company logo is printed in the middle of the front of the lower transparent member 12D, as shown in FIGS. 3 and 8. The symbol 14 is printed by, e.g., silk screen process printing using an ink obtained by mixing, e.g., medium ink and fluorescent white ink.

Furthermore, as shown in FIG. 8, a reflecting surface 15 having a predetermined length in the horizontal direction is formed above the symbol 14 printed on the lower transparent member 12D, and a plurality of, e.g., seven light-emitting diodes (LEDs) 16 as light sources are provided in parallel in a manner corresponding to the reflecting surface 15 of the lower transparent member 12D, whereby to arrange such that light from the plurality of LEDs 16 passes through the lower transparent member 12D.

In the present example, a lens sheet 17 having a plurality of linear, V-grooves, and a diffusion sheet 18 are laminated and fixed by, e.g., adhesion, on a portion (side-surface light-incident section) through which the light from the plurality of LEDs 16 corresponding to the reflecting surface 15 of the lower transparent member 12D passes, as shown in FIG. 8.

As this lens sheet 17 having the plurality of linear, V-grooves, e.g., a "Vikuiti" (trademark) BEF II brightness enhancement film having a plurality of 90° V-grooves and manufactured by Sumitomo 3M Limited may be usable.

In the present example, the lens sheet 17 and the diffusion sheet 18 are inserted between the LEDs 16 and the light-incident section of the lower transparent member 12D, whereby the light from the LEDs 16 hitherto seen as a plurality of light rays illuminates the symbol 14 in the form of even, smooth light, providing satisfactory illumination.

Further, in the present symbol illumination apparatus, a silk screen processed print 19 with a gradational design is provided on the lower-side end face of this lower transparent member 12D, as shown in FIG. 8. In this case, as a result of the silk screen processed print 19 with a gradational design, the light from the LEDs 16 no longer leaks to the outside of the lower side of this lower transparent member 12D.

Figure 9:
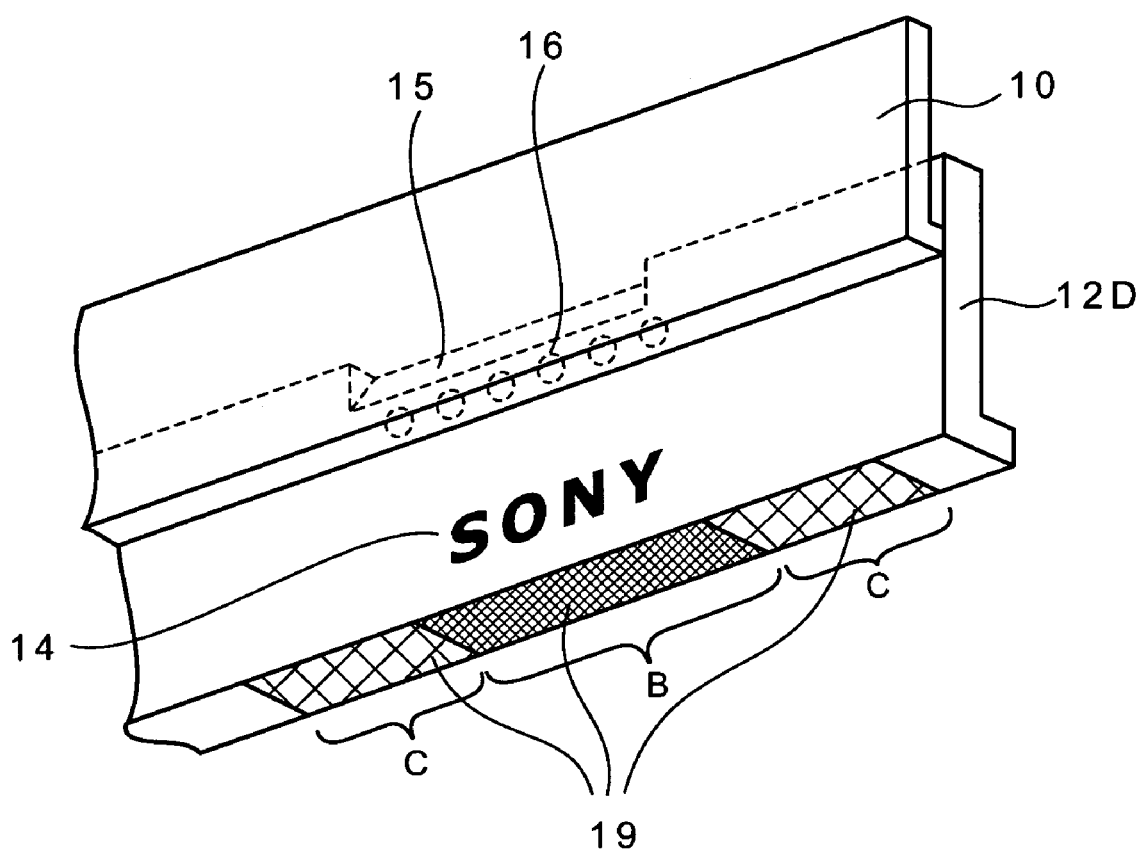
FIG. 9 is a perspective view of an example of a main portion as viewed from a side indicated by an arrow A of FIG. 3.

FIG. 9 shows details of the silk screen processed print 19 with a gradational design as viewed from a side indicated by an arrow A of FIG. 3. The silk screen processed print 19 with a gradational design includes a section B and sections C on left and right sides contiguous thereto. The section B is printed solidly over such a range as not to leak the light of the LEDs 16 arranged in a manner corresponding to the width of the symbol 14, to the outside of the lower side of the lower transparent member 12D. Further, the two sections C are printed with so-called gradation by which the printing density is reduced as they are away from the section B.

Furthermore, when silver is used as the color of an ink used for the silk screen processed print 19 with a gradational design, the light from the LEDs 16 is reflected by the silk screen processed print 19 with a gradational design on the lower end face of this lower transparent member 12D, to substantially double the luminance of the illumination for the symbol 14, whereby to produce an effect of higher-quality illumination.

Therefore, according to the present example, the quality can be improved and leakage of light can be prevented as to the illumination for the symbol 14 which is to be seen as if floating on the flat panel display.

Returning to FIG. 1 again, the front assembly 1 is obtained as follows. First, the engageable projections 12a on the ends of the upper and lower transparent members 12U and 12D are slidably engaged with the engageable holes 10c on the opposed upper-side and lower-side ends of the frame 10. Next, the engageable projections 11a on the respective inner ends of the left and right speaker mounting plates 11L and 11R are slidably engaged with the engageable holes 10b in the left-side and right-side ends of the frame 10, respectively. At this time, engageable projections 12b having elasticity and projecting from both ends of the upper and lower transparent members 12U and 12D that have been slidably engaged with the frame 10 beforehand are fitted into engageable holes 11b provided in respective ends of the left and right speaker mounting plates 11L and 11R.

Next, the rectangular filter glass 2 that is slightly larger than the video display screen of this plasma display panel 4 is arranged at a predetermined location on the rear of this frame 10, and thereafter, using an upper-side front frame 20a, a lower-side front frame 20b, left-side and right-side front frames 20c and 20d, which are made by machining an iron plate, and four corner brackets 21a, 21b, 21c and 21d which are made by machining an iron plate, and further using machine screws or the like, this frame 10, the left and right speaker mounting plates 11L and 11R, the upper and lower transparent members 12U and 12D, and the filter glass 2 are fixed integrally, as shown in FIG. 2.

In the present example, it is arranged such that the plasma display panel 4, its drive circuit, speakers 5, and the like are incorporated between the front assembly 1 assembled as shown in FIG. 2 and the rear cover 3 having a predetermined shape, as shown in FIGS. 5, 6, and also such that the LEDs 16 are incorporated into the lower transparent member 12D in such a configuration as shown in FIG. 8.

According to the present embodiment, the front assembly 1 is formed from a five-piece configuration including the frame 10, left and right speaker mounting plates 11L and 11R, and upper and lower transparent members 12U and 12D. As a result, the molding dies for the respective five pieces of the front assembly 1 can be kept small and can thus be relatively inexpensive, and also their manufacturability, dimensional accuracy can be improved, and a novel design based on the five-piece configuration can also be realized. For example, when the video screen is viewed through the upper and lower transparent members 12U and 12D, the video screen is seen as if it were floating in the air, to make the audience feel liberated in terms of design.

Further, according to the present example, it is arranged such that the frame 10, left and right speaker mounting plates 11L and 11R, and upper and lower transparent members 12U and 12D are slidably engaged with each other. As a result, the front assembly can be made thinner in structure, and the video display apparatus can also be made thinner in structure. According to the present embodiment, the video display screen of the PDP flat panel display can be set to, e.g., 42 inches, with its depth being as thin as, e.g., 9.8 cm.

Note that the present invention is not limited to the above-described example, but may, of course, be embodied in various other configurations without departure from the scope and spirit of the present invention.

The present document contains subject matter related to Japanese Patent Application JP 2004-205208 filed in the Japanese Patent Office on Jul. 12, 2004, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A symbol illumination apparatus, comprising: a transparent member having a front surface and a symbol printed on the front surface;
   a plurality of light sources for illuminating the symbol;
   a lens sheet; and
   a diffusion sheet, the diffusion sheet being attached to the lens sheet,
   wherein light from the plurality of light sources to passes through an interior of the transparent member from one side of said transparent member to illuminate the symbol: and
   wherein the lens sheet and the diffusion sheet are between the transparent member and the plurality of light sources.

2. The symbol illumination apparatus as claimed in claim 1, wherein the transparent member is a substantially flat plate and has a reflection surface allowing the light from the plurality of light source arranged on a rear surface of the one side of the transparent member to reflect at a substantially right angle toward the interior of the transparent member.

3. The symbol illumination apparatus as claimed in claim 1, wherein a gradation design print is applied on the other side of the transparent member.

4. The symbol illuminating apparatus as claimed in claim 3, wherein the gradation design print is applied with an ink of a color allowing the light from the plurality of light sources to reflect toward the interior of the transparent member.

5. The symbol illumination apparatus as claimed in claim 4, wherein the color of the ink is silver.

6. A video display apparatus, comprising:
   a front assembly, the front assembly including a transparent member having a front surface and a symbol printed on the front surface; for illuminating the symbol;
   a lens sheet; and
   a diffusion sheet, the diffusion sheet being attached to the lens sheet.
   wherein light from the plurality of light sources passes through an interior of the transparent member from one side of the transparent member to illuminate the symbol, and
   wherein the lens sheet and the diffusion sheet are between the transparent member and the plurality of light sources 7. The video display apparatus as claimed in claim 6, wherein the transparent member is a substantially flat plate and has a reflection surface allowing the light from the plurality of light sources arranged on a rear surface of the one side of the transparent member to reflect at a substantially right angle toward the interior of the transparent member.

8. The video display apparatus as claimed in claim 6,wherein a gradation design print is applied on the other side of the transparent member.

9. The video display apparatus as claimed in claim 8, wherein the gradation design print is applied with an ink of a color allowing the light from the plurality of light sources to reflect toward the interior of the transparent member.

10. The video display apparatus as claimed in claim 9, wherein the color of the ink is silver.

* * * * *

UNITED STATES PATENT AND TRADEMARK OFFICE
CERTIFICATE OF CORRECTION

PATENT NO. : 7,513,429 B2 Page 1 of 1
APPLICATION NO. : 11/177357
DATED : April 7, 2009
INVENTOR(S) : Hitoshi Takahashi et al.

It is certified that error appears in the above-identified patent and that said Letters Patent is hereby corrected as shown below:

In claim 1, column 6, line 12, "sources to passes" should read --sources passes--.

In claim 1, column 6, line 14, "said" should read --the--.

In claim 1, column 6, lines 14-15, "symbol:" should read --symbol,--.

In claim 2, column 6, line 22, "source" should read --sources--.

In claim 4, column 6, line 28, "illuminating" should read --illumination--.

In claim 6, column 6, line 38, "surface; for" should read --surface; a plurality of light sources for--.

In claim 6, column 6, line 41, "sheet." should read --sheet,--.

In claim 6, column 6, line 47, "sources" should read --sources.--.

In claim 8, column 6, line 55, "6,wherein" should read --6, wherein--.

Signed and Sealed this

Twenty-sixth Day of May, 2009

JOHN DOLL
*Acting Director of the United States Patent and Trademark Office*